Sept. 23, 1930.   H. BROOKE   1,776,538
APPARATUS FOR SERVING GLASS
Original Filed Jan. 25, 1927
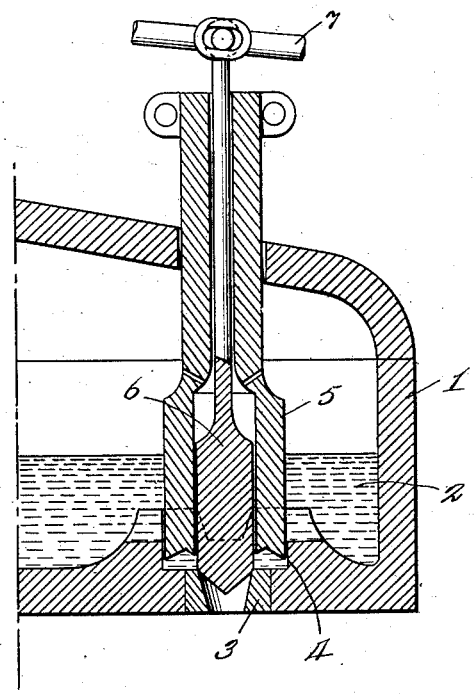
INVENTOR
HOMER BROOKE
BY
J. S. Wooster
ATTORNEY Patented Sept. 23, 1930

1,776,538

UNITED STATES PATENT OFFICE

HOMER BROOKE, OF MOUNT VERNON, NEW YORK; MARY ISAPHENE IVES BROOKE EXECUTRIX OF SAID HOMER BROOKE, DECEASED

APPARATUS FOR SERVING GLASS

Application filed January 25, 1927, Serial No. 163,486. Renewed December 18, 1929.

The present invention is concerned with the provision of an improved apparatus for delivering molten slugs of glass from a glass furnace to any suitable type of blowing and forming machine or apparatus. The invention is especially concerned with an apparatus that will rapidly deliver uniform glass slugs from the furnace while at the same time eliminating the present difficulty of a trickling flow of molten glass with the consequent trapping of air bubbles in the slug.

Another form of apparatus is designed for delivering globular slugs into moulds in which they are formed into containers of larger diameter, such as tumblers, relatively wide mouthed containers such as milk jars, fruit jars, etc., or into flat-wear or other solid pressed glass, such as dishes, plaques, etc.

More general objects of the invention are to provide an apparatus of simple, practical construction which will be rugged, durable and efficient in use, well suited to the requirements of commercial practice and economical manufacture, and operation.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawing, wherein a vertical sectional view through a furnace showing the mechanism for forming and delivering a molten slug is illustrated.

Referring to the drawing 1 indicates the usual laterally projecting bay of a glass furnace into which the molten glass 2 flows. The floor of the bay 1 is provided with a discharge 3 which is surrounded by the raised annular seat 4 which in effect forms a measuring cylinder.

A sleeve 5 adapted to fit inside the seat 4 is disposed in vertical position in the bay 1 and extends through the top wall of the bay. A plunger 6 fits neatly within and extends above the sleeve 5 and both the plunger and sleeve are adapted for vertical reciprocatory motion and the plunger 6 is also adapted for limited vertical sliding movement relative to the sleeve 5 by actuation through lever 7. The means for actuating the sleeve and plunger are not shown as any well known means for actuating plungers and sleeves in glass furnaces may be used, or they may be manually operated.

In operation both the sleeve 5 and plunger 6 are drawn up to allow molten glass to fill the measuring cylinder defined by the seat 4 and then moved down together until the sleeve 5 has entered the seat 4 thereby segregating a quota of the body of molten glass immediately above the discharge 3; the plunger 6 can then be moved to its lowermost position to completely extrude the slug. The plunger 6 is then rapidly returned through the short distance permitted by the lost motion between the sleeve and cylinder, thereby tending to suck up the remaining glass in the discharge 3, and prevent it from piling upon or retarding the movement of the knives or equivalent means used to sever the extruded slug.

If the plunger 6 descends slightly in advance of the sleeve 5, it will cut off the flow of glass before the measuring cylinder is quite empty, thereby providing a means for regulating the amount of glass delivered at each stroke of the plunger.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. In a glass furnace including a laterally projecting bay having an outlet opening, a measuring cylinder embracing the opening, a sleeve mounted for reciprocation into an out of said cylinder and neatly fitting s cylinder and a plunger fitting neatly within said sleeve and adapted to fit the opening and mounted for reciprocation within said sleeve an movable independently of said sleeve.

2. In combination with a receptacle for molten glass having an opening in the bottom thereof, a sleeve located above the opening and extending into the glass within the receptacle, a plunger fitting neatly within said sleeve, means for moving said sleeve and plunger away from the opening to accumulate a charge of molten glass and toward the opening to segregate the charge, and for further moving said plunger independently of said sleeve toward the opening to extrude the charge and cut off the flow of glass from the opening.

3. In combination with a receptacle for molten glass having an opening in the bottom thereof, a seat embracing said opening, a sleeve located above the opening adapted to engage said seat, a plunger fitting neatly within said sleeve adapted to plug the opening, and means for moving said sleeve and plunger away from the opening to accumulate a charge of molten glass and toward the opening until the sleeve engages said seat to segregate the charge from the body of molten glass, and for further moving said plunger independently of said sleeve toward the opening to extrude the segregated charge therefrom and plug said opening.

4. In combination with a receptacle for molten glass having an opening in the bottom thereof, a seat embracing said opening, a sleeve located above the opening adapted to engage said seat, a plunger fitting neatly within said sleeve adapted to plug the opening, severing means adjacent and beneath said opening, and means for moving said sleeve and plunger away from the opening to accumulate a charge of molten glass and toward the opening until the sleeve engages said seat to segregate the charge from the body of molten glass, and for further moving said plunger independently of said sleeve toward said opening to extrude the segregated charge therefrom and plug said opening, and away from said opening after a slug of glass has been severed from the charge by said severing means to draw up into said receptacle the remainder of said charge.

5. In combination with a receptacle for molten glass having an opening in the bottom thereof, an annular member embracing the opening and projecting upwardly from the bottom into the body of molten glass, a sleeve located above the opening adapted to fit neatly within said annular member, a plunger fitting neatly within said sleeve adapted to plug the opening, severing means adjacent and beneath the opening, and means for moving said sleeve and plunger away from the opening to accumulate a charge of molten glass and toward the opening until the sleeve enters the measuring cylinder to segregate the charge from the body of molten glass, and for further moving said plunger independently of said sleeve toward the opening to extrude the segregated charge therefrom and plug the opening, and away from said opening after a slug of glass has been severed from the charge by said severing means to draw up into said receptacle the remainder of said charge.

HOMER BROOKE.